US008681180B2

(12) United States Patent
Ellis et al.

(10) Patent No.: US 8,681,180 B2
(45) Date of Patent: Mar. 25, 2014

(54) POST-RENDER GRAPHICS SCALING

(75) Inventors: Brian Ellis, San Diego, CA (US); Steven Todd Weybrew, Portland, OR (US); Simon Wilson, Dacona, CO (US); Baback Elmieh, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1403 days.

(21) Appl. No.: 11/955,253

(22) Filed: Dec. 12, 2007

(65) Prior Publication Data

US 2008/0143760 A1    Jun. 19, 2008

Related U.S. Application Data

(60) Provisional application No. 60/870,348, filed on Dec. 15, 2006.

(51) Int. Cl.
*G09G 5/00* (2006.01)
*G06F 15/00* (2006.01)
*G06T 1/00* (2006.01)

(52) U.S. Cl.
USPC .......................................... 345/660; 345/501

(58) Field of Classification Search
USPC .................................................. 345/502, 660
See application file for complete search history.

(56) References Cited

U.S. PATENT DOCUMENTS

| | | | | |
|---|---|---|---|---|
| 6,788,309 B1* | 9/2004 | Swan et al. | .................. | 345/629 |
| 7,196,733 B2* | 3/2007 | Aratani et al. | ................ | 348/581 |
| 7,307,669 B2* | 12/2007 | Bhatia et al. | ................. | 348/581 |
| 7,365,757 B1* | 4/2008 | Callway et al. | ............... | 345/629 |
| 2002/0149594 A1 | 10/2002 | Grigor | | |
| 2006/0038823 A1 | 2/2006 | Arcas | | |
| 2006/0164938 A1 | 7/2006 | Kuno | | |
| 2007/0132787 A1* | 6/2007 | Ko | .............................. | 345/660 |
| 2007/0192818 A1* | 8/2007 | Bourges-Sevenier et al. | ........................... | 725/132 |

FOREIGN PATENT DOCUMENTS

TW          376669       12/1999

OTHER PUBLICATIONS

International Search Report—PCT/US07/087692—International Search Authority, European Patent Office—Jun. 20, 2008.
Written Opinion—PCT/US07/087692—International Search Authority, European Patent Office—Jun. 20, 2008.
Ranganath V.R., "Raster graphics integration on silicon," Midcon Conference Record, Ventura, CA, Nov. 30, 1982, pp. 2-1.
Synertek, "Synertek CRT Controller Microprocessor Products, SY6545-1 Data Sheet," Internet Citation, Nov. 30, 1982.
Kozono I., et al., "Intelligent display processor AmuUPD72022," NEC GIHO—NEC Technical Journal, Nippon Denki Bunka Senta, Tokyo, JP, vol. 39, No. 10, Oct. 1986, pp. 64-69.
Austin J.D. et al., "Medical Image Processing on an Enhanced Workstation," Proceedings of the SPIE. SPIE, Bellingham, VA, vol. 914, 1988, pp. 1317-1324.

(Continued)

*Primary Examiner* — Jacinta M Crawford
(74) *Attorney, Agent, or Firm* — James R. Gambale, Jr.

(57) ABSTRACT

An apparatus, method, and computer program product for scaling a rendered surface. The apparatus includes a graphics processor configured to render a surface at a source resolution, wherein a scaling parameter is associated with the surface, the scaling parameter defining the source resolution and a destination resolution. The apparatus further includes a display processor configured to scale the rendered surface to the destination resolution. Preferably, the scaling parameters are EGL surface attributes.

24 Claims, 9 Drawing Sheets

(56) References Cited

OTHER PUBLICATIONS

Anonymous, "Coordinate Transformation in a Graphics Display Processor," IBM Technical Disclosure Bulletin, vol. 27, No. 1A, Jun. 1, 1984, pp. 139-142.

Pulli K., et al., "Designing graphics programming interfaces for mobile devices," IEEE Computer Graphics and Applications, IEEE Service Center, New York, NY, vol. 25, No. 6, Nov. 2005, pp. 66-75.

Kozono I et al., "Intelligent display processor—AMuUpPD72022" NEC GIHO—NEC Technical Journal, Nippon Denki Bunka Senta, Tokya, JP, vol. 39, No. 10, Oct. 1986, pp. 64-69, XP009098256.

Taiwan Search Report—TW096148351—TIPO—May 9, 2011.

\* cited by examiner

800

| Attribute | Description |
|---|---|
| EGL VG ALPHA FORMAT | Alpha format for OpenVG |
| EGL VG COLORSPACE | Color space for OpenVG |
| EGL CONFIG ID | ID of EGLConfig surface was created with |
| EGL HEIGHT | Height of surface |
| EGL HORIZONTAL RESOLUTION | Horizontal dot pitch |
| EGL LARGEST PBUFFER | If true, create largest pbuffer possible |
| EGL MIPMAP TEXTURE | True if texture has mipmaps |
| EGL MIPMAP LEVEL | Mipmap level to render to |
| EGL PIXEL ASPECT RATIO | Display aspect ratio |
| EGL RENDER BUFFER | Render buffer |
| EGL SWAP BEHAVIOR | Buffer swap behavior |
| EGL TEXTURE FORMAT | Format of texture: RGB, RGBA, or no texture |
| EGL TEXTURE TARGET | Type of texture: 2D or no texture |
| EGL VERTICAL RESOLUTION | Vertical dot pitch |
| EGL WIDTH | Width of surface |
| EGL Source Rect | Source resolution at which EGL surface was rendered |
| EGL Dest Rect | Destination resolution at which EGL surface will be displayed |

POST-RENDER GRAPHICS SCALING

RELATED APPLICATIONS

This application claims the benefit of provisional U.S. Application Ser. No. 60/870,348 filed Dec. 15, 2006, which is incorporated by reference herein.

TECHNICAL FIELD

This disclosure relates to graphics processing, and more particularly, relates to the scaling of graphics surfaces after a rendering process.

BACKGROUND

A graphics processing unit (GPU) is a dedicated graphics rendering device utilized to render, manipulate and sometimes display computerized graphics. GPUs are typically built with a highly parallel structure that provides more efficient processing than typical, general purpose central processing units (CPUs) for a range of complex graphics-related algorithms. For example, the complex algorithms may correspond to representations of three-dimensional computerized graphics. A GPU may implement a number of so-called "primitive" graphics operations, such as forming points, lines, and triangles, to create complex, three-dimensional images on a display more quickly than drawing the images directly to the display with a CPU.

GPUs and other graphics hardware are often limited in terms of available memory and power resources. In particular, graphics hardware used in mobile devices is typically very limited with regard to these resources. Since graphics hardware embedded in a mobile device is typically powered by a battery, the amount of power that can be dedicated to graphics hardware is often limited in order to ensure a desirable amount of battery life for the mobile device. As such, maximum frame rates for mobile graphics hardware is often limited when compared to graphics hardware for desktop computers, since an increase in frame rate also demands an increase in power usage.

Large amounts of internal memory available for mobile graphics hardware are typically limited as it is often desirable to keep the silicon area of mobile devices small. Most current mobile graphics architectures implement a binning algorithm to reduce the amount of internal memory that is needed. A binning algorithm essentially separates a graphics frame into two or more different areas. A graphics frame is the display area for a particular scene that is to be rendered. Each of these areas is separately rendered using a small amount of memory internal to a graphics processor. In this way, the amount of internal memory needed is reduced. This increases the computation and memory bandwidth required to render an entire scene. However, binning algorithms are typically optimized for a predetermined display resolution. Current mobile graphics hardware typically renders scenes to a Video Graphics Array (VGA) resolution of 640×480 pixels or lower. If a scene is to be displayed at a resolution other than the predetermined resolution, the benefits of the binning algorithm may not be realized.

Alternatively, when pixel quality is of maximum importance, GPUs typically perform anti-aliasing techniques. The most common methods of anti-aliasing involve multi-sample rendering, multi-pass accumulation or expensive per-primitive edge computations. However, such techniques often require more memory, power and/or silicon area than is typically available for graphics hardware in mobile devices. As such, these techniques are typically not performed in the mobile setting.

The need for increased and varying display resolutions across different mobile devices is often incompatible with the abilities of current graphics hardware given their limitations in mobile settings. As such, the quality of graphics, including 3D graphics, available to be displayed on mobile devices has been difficult to improve, and as such, the ability to take advantage of higher resolution displays employed in mobile devices has largely been unrealized.

SUMMARY

In view of the foregoing, this disclosure presents methods, apparatuses, and computer program products for improving power consumption and sustainable frame rate performance for graphics processing by reducing the number of pixels rendered by a GPU and/or reducing the number of bins needed for a binning algorithm in situations where the desired display resolution for a graphics frame is larger than the resolution at which a GPU renders the graphics frame. This is accomplished by using a processor other than the GPU to scale a rendered graphics frame to a desired resolution.

In addition, the methods, apparatuses, and computer program products may be used to improve pixel quality by having a GPU render a scene to a resolution that is larger than actually displayed and then downscaling the scene with another processor as it is copied to the display. In some scenarios, this downscaling operation achieves similar results as multi-pass accumulation buffer techniques without the associated hardware costs.

According to one embodiment, an apparatus for scaling a rendered graphics frame includes a graphics processor configured to render a surface at a source resolution, wherein a scaling parameter is associated with the surface, the scaling parameter defining the source resolution and a destination resolution. The apparatus further includes a display processor configured to scale the rendered surface to the destination resolution. Preferably, the scaling parameters are EGL surface attributes.

The details of one or more embodiments are set forth in the accompanying drawings and the description below. Other features, objects, and advantages of the invention will be apparent from the description and drawings, and from the claims.

BRIEF DESCRIPTION OF DRAWINGS

FIG. 8 shows attributes for an EGL surface including scaling parameters.

DETAILED DESCRIPTION

Figure 1:
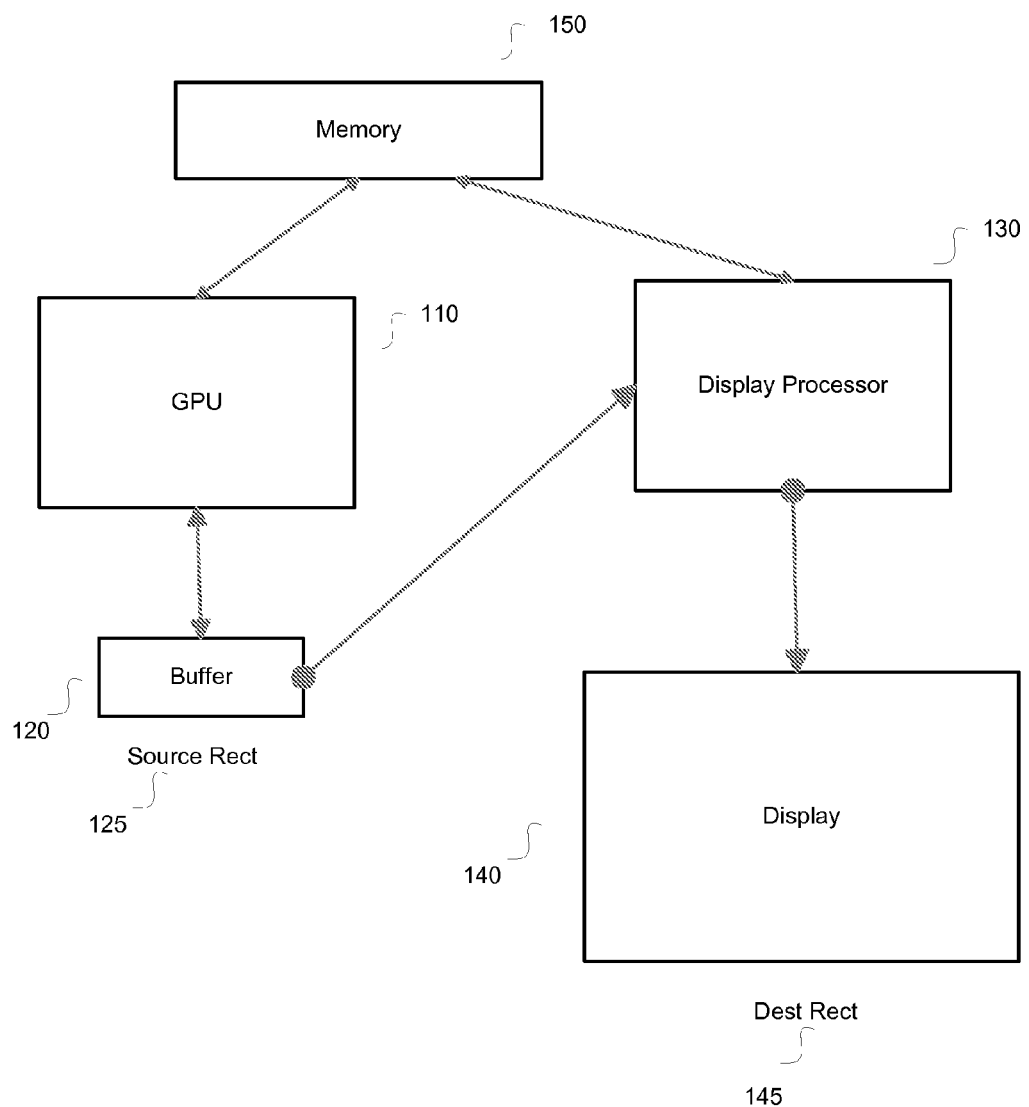
FIG. 1. is a block diagram of a GPU and a display processor.

FIG. 1. shows a block diagram of a GPU and a display processor. GPU 110 is a graphics processor used for rendering a graphics frame for eventual display. For this disclosure, the term render refers to both 3D and 2D rendering. As examples, GPU 110 may utilize Open Graphics Library (OpenGL) instructions to render 3D graphics frames, or may utilize Open Vector Graphics (OpenVG) instructions to render 2D graphics frames. However, any standards, methods, or techniques for rendering graphics may be utilized by GPU 110.

GPU 110 may carry out instructions that are stored in memory 150. Memory 150 may include any permanent or volatile memory capable of storing instructions. In addition, GPU 110 may execute instructions that are received over an air interface (e.g., CDMA 1x, EV-DO, WiFi). Graphics frames rendered by GPU 110 are stored in buffer 120. Buffer 120 may be any permanent or volatile memory capable of storing data.

In this context, a graphics frame is the entire scene that is to be displayed. A graphics frame may be made up of one or more surfaces that may be individually rendered by GPU 110. A surface is either a 2-D image or a rendered 2-D representation of a 3-D object from a certain viewpoint. Multiple rendered surfaces that are displayed in the graphics frame may be combined through overlay and/or blending operations.

Surfaces rendered by GPU 110 are rendered to a particular resolution. In graphics terms, resolution is the number of pixels shown on a display. For example, VGA resolution is 640 pixels by 480 pixels. Resolution does not refer to the physical size of the display, but rather to the number of pixels displayed. The resolution to which GPU 110 renders a surface is not necessarily the resolution of the display. To distinguish this fact, the resolution to which GPU 110 renders is called the source resolution. The source rectangle (source rect 125) specifies a rectangular subset, or region of interest (ROI), of the source resolution which is the input to the scaling operation. The origin of this rectangular subset may or may not coincide with the origin of the source resolution. For the purposes of this disclosure, the origin of the rects, the source buffer and the display is defined as the lower left corner. The resolution that is actually displayed is referred to as the destination resolution. The destination rectangle (dest rect 145) specifies a rectangular subset of the display to which the output of the scaling operation is written. The origin of this rectangular subset may or may not coincide with the origin of the display. The dest rect 145 may be predetermined based on the characteristics of the display, or may be determined by a program making use of the GPU. The value of the source rect 125 and dest rect 145 may be stored in memory 150 for use by GPU 110 and display processor 130.

In particular, the source rect 125 and dest rect 145 may be stored as parameters associated with a surface that is to be rendered and displayed. As one example, these parameters may be attributes included in an Embedded-System Graphics Library (EGL™) description of the surface. EGL is an interface between APIs such as OpenGL ES or OpenVG and an underlying native platform window system. In this way, third-party developers of applications may define scaling factors in a familiar programming language without having to develop separate commands for instructing a particular display processor to perform a scaling process. FIG. 8 shows an example of EGL surface attributes 800 including the source rect 125 and dest rect 145 scaling parameters.

Display processor 130 is a processor for driving display 140 (i.e., sending the pixel color values to the display), and for performing post-rendering processes on the rendered surfaces. Display processor 130 may be any type of processor. As one example, display processor 130 may be a Mobile Display Processor (MDP) embedded in Mobile Station Modems designed by Qualcomm, Inc. of San Diego, Calif. An MDP is a processor that has been dedicated to and optimized for driving a display and performing post-render functions on a rendered surface. Such functions may include scaling, rotation, blending, and overlaying. Display processor 130 may be constructed to execute instructions stored in memory 150.

When GPU 110 has rendered a surface in the source rect 125 and stored it in buffer 120, display processor 130 retrieves the rendered surface from buffer 120 and scales the surface to the dest rect 145 of the display. The dest rect 145 may be obtained from memory 150 or may be predetermined based on the characteristics of display 140. In particular, dest rect 145 may be retrieved from a dest rect attribute included with the EGL description of the rendered surface. By using a different processor for scaling, processing overhead (which, as described above, is often expensive in mobile settings) is saved for the GPU.

Figure 9:
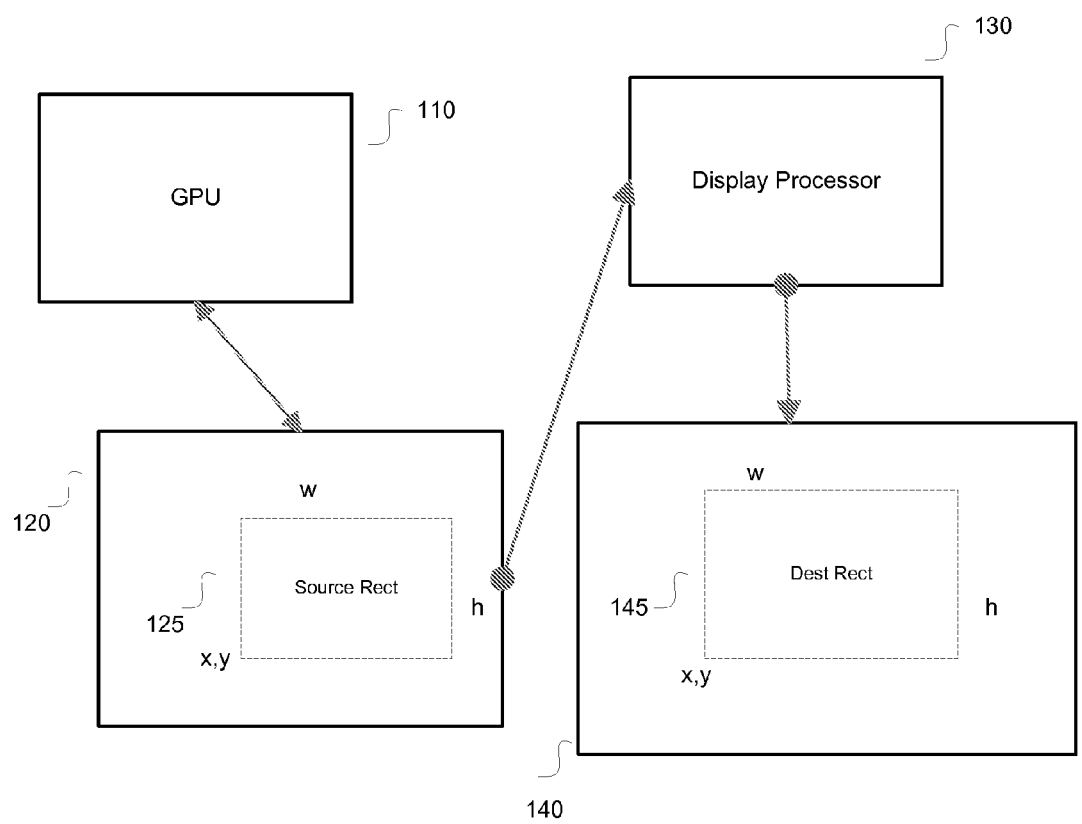
FIG. 9 shows a block diagram with source rect and dest rect offsets.

Source rect 125 and dest rect 145 may be each defined with a width and height value that indicates the number of pixels in each direction. The source rect may also include an x,y coordinate that defines an offset relative to some location in the buffer rendered by the GPU. As seen in FIG. 9, source rect 125 is defined by an x,y coordinate that is relative to the lower left corner of buffer 120. In this example, the lower left corner of buffer 120 is defined as 0,0. The x,y coordinate of source rect 125 may be defined from any location in buffer 120. By defining the lower left corner of source rect 125, in addition to identifying the height and the width of the source rect, specific portions of the image rendered in buffer 120 (up to the entire buffer) may be selected for eventual display.

Dest rect 145 may also be defined by an x,y value. The dest rect x,y value defines an offset relative to some point on display 140. As seen in FIG. 9, dest rect 145 is defined by an x,y coordinate that is relative to the lower left corner of display 140. In this example, the lower left corner of display 140 is defined as 0,0. The x,y coordinate of dest rect 145 may be defined from any location on display 140. By defining the lower left corner of dest rect 145, the desired image defined by source rect 125 may be offset to any location in display 140.

As shown in FIG. 1, dest rect 145 is the maximum resolution capable for display 140. However, display processor 130 need not always scale the rendered surfaces from the source rect to the maximum resolution of a display. Display processor 130 may be configured or instructed to scale the rendered surface from a source rect 125 to any resolution at or below the maximum resolution of the display. Preferably, the scaling ratio of source rect 125 to dest rect 145 is between 0.25 and 4.00. However, any scaling ratio may be used. One measure of scaling ratio can be determined by dividing the width of the source rect 125 in the x direction by the width of the dest rect 145 in the x direction. Another measure of scaling ration can be determined by dividing the height of the source rect 125 in the y direction and the height of the dest rect 145 in the y direction. The scaling ratio for the width or height may be handled independently to effect horizontal or vertical stretching, or may be made the same in order to preserve the same aspect ratio from source rect to dest rect. Examples of scaling processes will be discussed in more detail with reference to FIGS. 5-7 below.

Utilizing EGL scaling attributes enables resealing an EGL window surface as the surface contents are copied to the target display device while posting the buffer. Both upscaling and downscaling are supported. The initial dimensions of the EGL surface will match the target display. The user specifies one or two rectangular regions known as the source and dest rects. The source rect is scaled as required to the size specified in the dest rect. Usually, the source rect will be less than or equal to the size of the EGL surface. However, a larger source rect, up to the implementation limit, may be specified when downscaling is desired. Downscaling can be used to achieve an approximation of anti-aliasing for rendering engines which have no internal anti-aliasing capability. Preferably, the rendering engine (i.e., the GPU) renders a surface which is at least twice the desired size in both dimensions.

Using smaller window surface dimensions can save render time or, equivalently, increase sustainable frame rate. On platforms where a memory constrained rendering engine cannot operate on surfaces of the desired dimension, upscaling smaller window surfaces can produce full sized surfaces on the target display.

The destination rect specifies the dimensions to which the entire (possibly resized) EGL window surface will be scaled as a post rendering operation. The destination rect may be passed as NULL if the original full display size is the desired output. The destination rect must be less than or equal to the size of the target display device.

For power reduction and frame rate improvement, the 3D graphics pipeline in GPU 110 may be setup to render to a smaller surface than the actual display area; e.g. VGA (640×480) rather than WVGA (800×480). This reduces both the pixel count and the number of bins required to render the surface. Once the 3D pipeline has completed rendering the surface at the lower resolution, the display processor is used to upscale it to the actual display resolution while it is being transferred to the actual display. For improved pixel quality, the 3D pipeline may be setup to render at a larger resolution than the display; e.g. VGA (640×480) instead of QVGA (320×240). For color images, for example, this technique effectively calculates 4 color values which are combined to determine each final pixel color. The combination of the 4 color values is performed by the display processor while downscaling the 3D surface as is it is transferred to the actual display.

In the rasterization load reduction scenario, the number of pixels rendered and bins required to render the scene are both reduced. This reduces the computation load on the GPU and the associated power consumption. The display processor requires fewer computations to upscale the 3D surface on the way to the display than would typically be required by the GPU to render the 3D scene at full resolution. In the image quality improvement scenario, a simple GPU with no special purpose hardware for multi-sampling or buffer accumulation may be used to generate an oversized surface. The surface is then downscaled on the way to the display which achieves similar results with accumulation style anti-aliasing.

Figure 2:
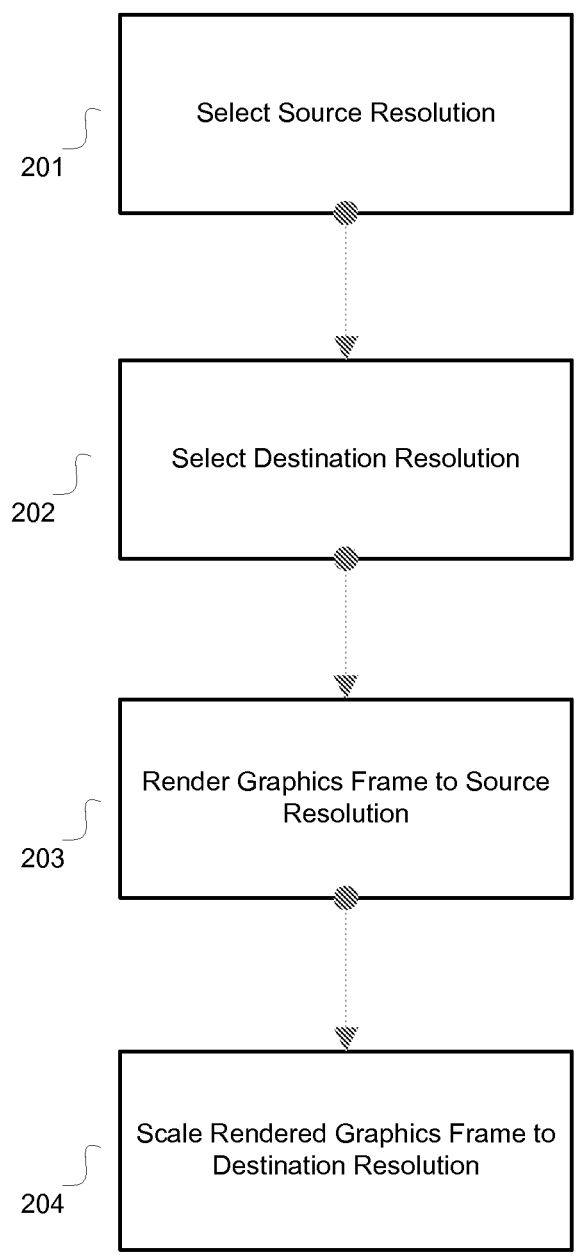
FIG. 2 is a flowchart of a method for scaling a surface.

FIG. 2 is a flowchart of a method for scaling a surface. In step 201, a source resolution for rendering a surface is selected. The source resolution may be selected based on the desired resolution of a user program utilizing the GPU (e.g., a video game), the resolution capabilities of the GPU, the resolution capabilities of the display, or a combination of these factors. As the GPUs are often optimized for particular resolutions, it is often desirable to select a source resolution that has been optimized for the particular GPU being used. The source resolution selected may be stored as a parameter associated with the rendered surface. For example, the source resolution may be stored as a source rect attribute in an EGL surface description.

In step 202, a destination resolution is selected. Again, the destination resolution may be selected based on the desired resolution of a user program utilizing the GPU (e.g., a video game), the resolution capabilities of the GPU, the resolution capabilities of the display, or a combination of these factors. The destination resolution selected may be stored as a parameter associated with the rendered surface. For example, the destination resolution may be stored as a dest rect attribute in an EGL surface description.

In step 203, a surface is rendered to the source resolution. Then in step 204, the rendered surface is scaled to the destination resolution.

Figure 3:
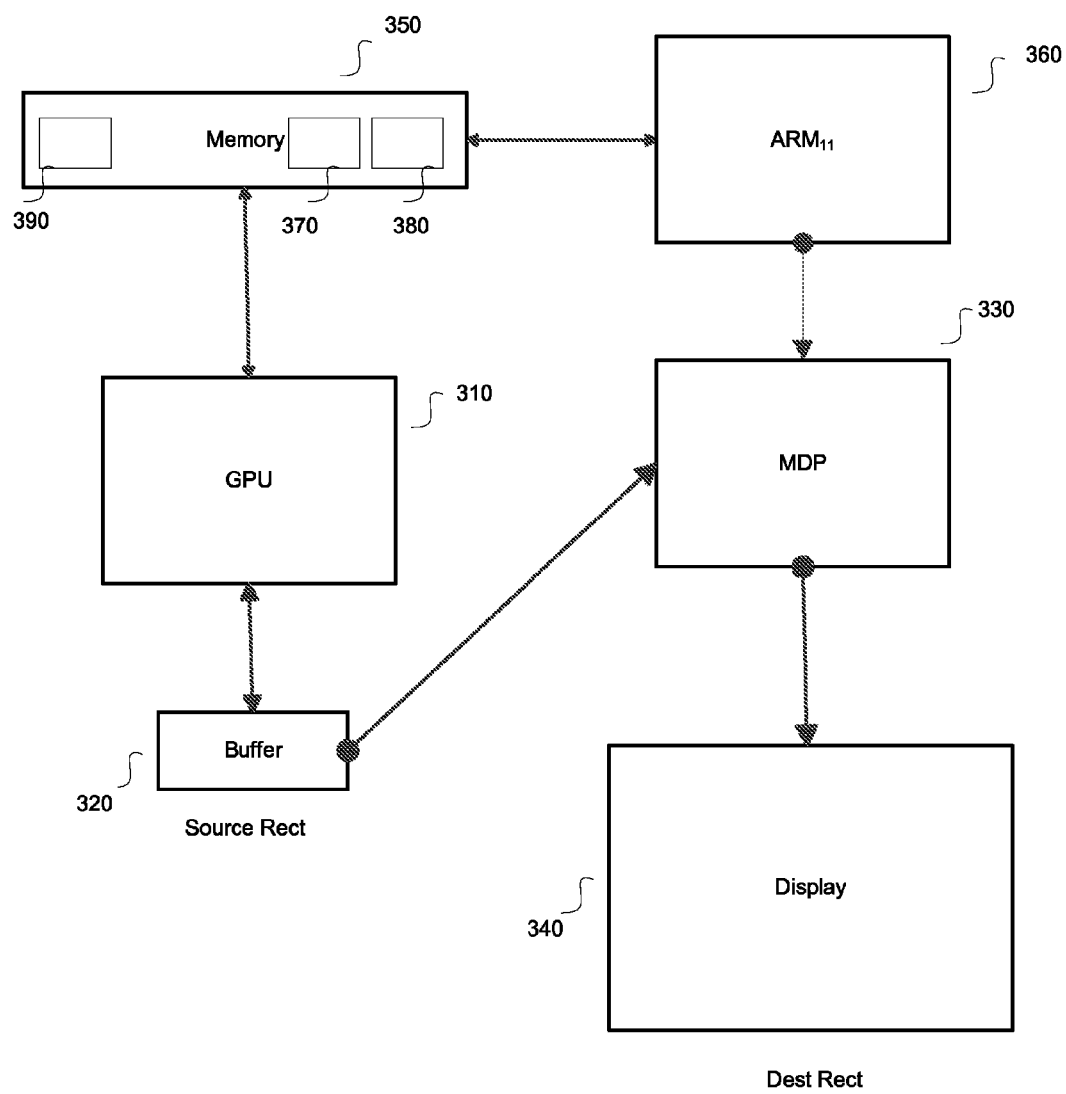
FIG. 3 is a block diagram of a GPU and a display processor in a mobile device.

FIG. 3 is a block diagram of a GPU and a display processor in a mobile device. GPU 310 executes instructions from user program 390 stored in memory 350. As an example, GPU 310 may be an Imageon 7 series GPU made by Advanced Micro Devices, Inc. of Sunnyvale, Calif. Memory 350 may be implemented as Flash random access memory (RAM). User program 390 may be any program that utilizes GPU 310. For example, user program 390 may be a video game. GPU 310 executes instructions from user program 390 and renders surfaces to be displayed into buffer 320. Buffer 320 may be synchronous dynamic RAM (SDRAM). User program 390 instructs GPU 310 as to what source rect at which to render surfaces. In addition, user program 390 may be configured to establish connection to display 340 and/or read system parameters in order to determine an appropriate dest rect. Such system parameters may be stored in memory 350. Once the source rect and dest rect have been selected by user program 390, user program 390 stores these values as parameters 370 in memory 350. As one example, parameters 370 may be stored as attributes in an EGL description of the rendered surface.

Memory 350 may also be used to store Application Programming Interface (API) 380. API 380 serves as the conduit between user program 390 and MDP 330. When GPU 310 has rendered a surface to buffer 320, user program 390 may execute an instruction to display that surface. Such a display instruction may be a function that calls API 380. API 380 then instructs control processor 360 to control MDP 330 to scale the rendered surface in buffer 320 to the selected dest rect stored as control parameters 370. Control processor 360 may be an Advanced RISC (reduced instruction set computer) Machine (ARM) processor such as the $ARM_{11}$ processor embedded in Mobile Station Modems designed by Qualcomm, Inc. of San Diego, Calif. MDP 330 may be a mobile display processor embedded in Mobile Station Modems designed by Qualcomm, Inc. of San Diego, Calif. MDP 330 retrieves the rendered surface from buffer 320, scales the surface to the desired dest rect, and drives display 340 to display the scaled rendered surface.

Figure 4:
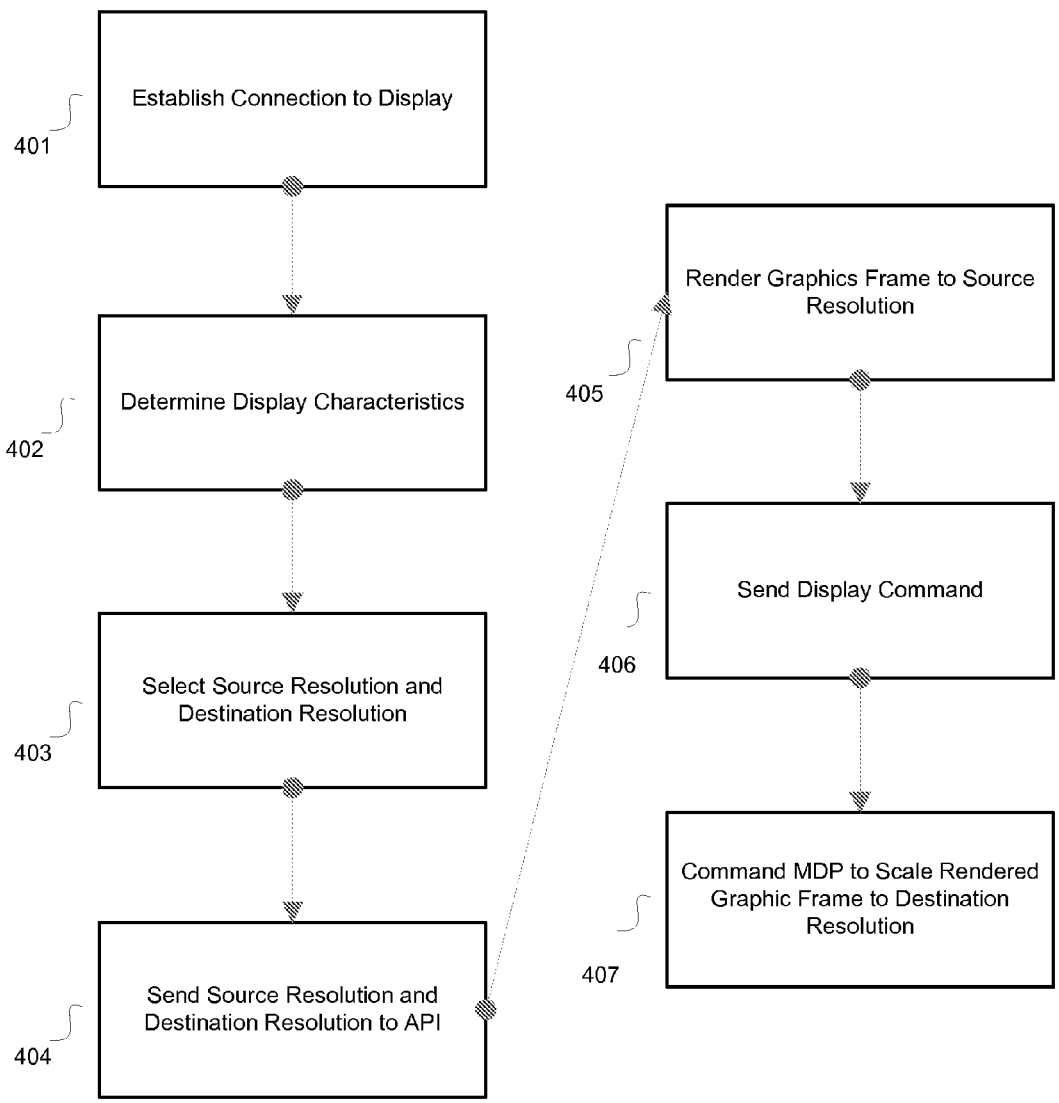
FIG. 4 is a flowchart of a method for scaling a surface.

FIG. 4 is a flowchart of a method for scaling a surface. In step 401, a connection to a display is established. Then in step 402, the characteristics of the display are determined. Such characteristics may be determined from data previously stored in memory, or through direct communication with the display. In step 403, a source resolution and destination resolution are selected. As described above, the source and destination resolutions may be selected based on the desired resolution of a user program utilizing a GPU (e.g., a video game), the resolution capabilities of a GPU, the resolution capabilities of the display, or a combination of these factors. In step 404, the source resolution and destination resolution are sent to or made available to an API. As one example, the source resolution and destination resolution may be stored as source rect and dest rect attributes in an EGL description of the rendered surface. In step 405, a surface is rendered to the source resolution. In step 406, a display command (e.g., eglSwapBuffers) is sent to the API. In step 407, the API sends a command to an MDP to scale the rendered surface to the destination resolution.

Figure 5:
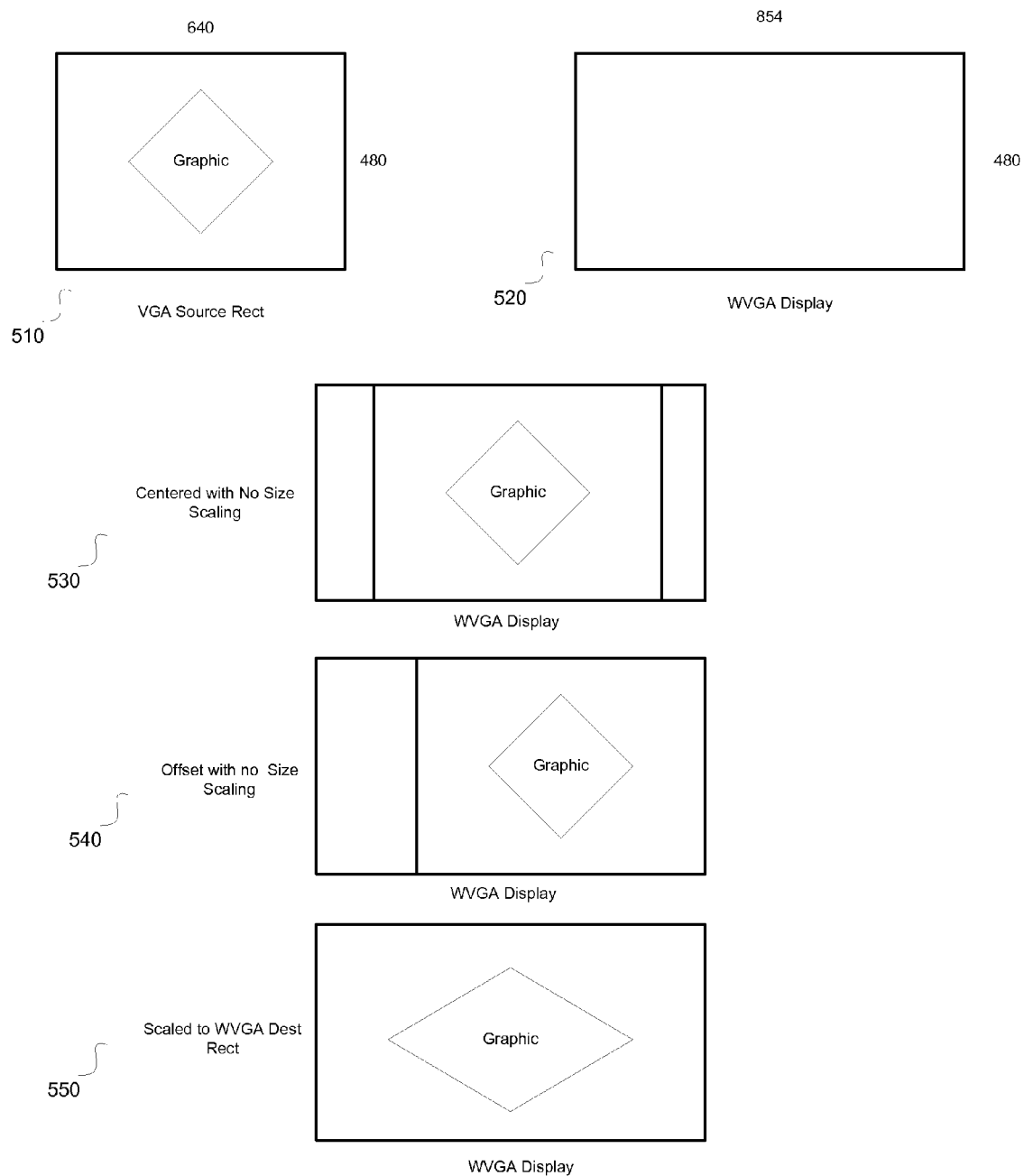
FIG. 5 shows examples of scaling from VGA to WVGA (Wide VGA).

FIG. 5 shows examples of scaling from VGA to WVGA (Wide VGA). Surface 510 is a graphic rendered to a VGA source rect. Display 520 is a WVGA display. VGA and WVGA have the same heights, but WVGA has a larger width. The aspect ratio (i.e., the ratio of width to height) of VGA is 4:3 (like a standard television), while the aspect ration of WVGA is 16:9 (like many High-Definition televisions). Example 530 shows the VGA source rect surface 510 centered on the WVGA display. This process does not scale surface 510 per se, but rather uses a dest rect that offsets the source rect to the center of the WVGA display while keeping it the same size. Example 540 shows the VGA source rect surface 510 with a different offset. It should also be noted that the entirety of surface 510 need not be used in the scaling process. An offset may be chosen so that a portion of surface 510 is not shown on a display. Example 550 shows VGA source rect surface 510 scaled to a dest rect that uses all available pixels in the WVGA display. Since the aspect ratios of the source rect and dest rect are different, any graphics in the surface will appear stretched.

Figure 6:
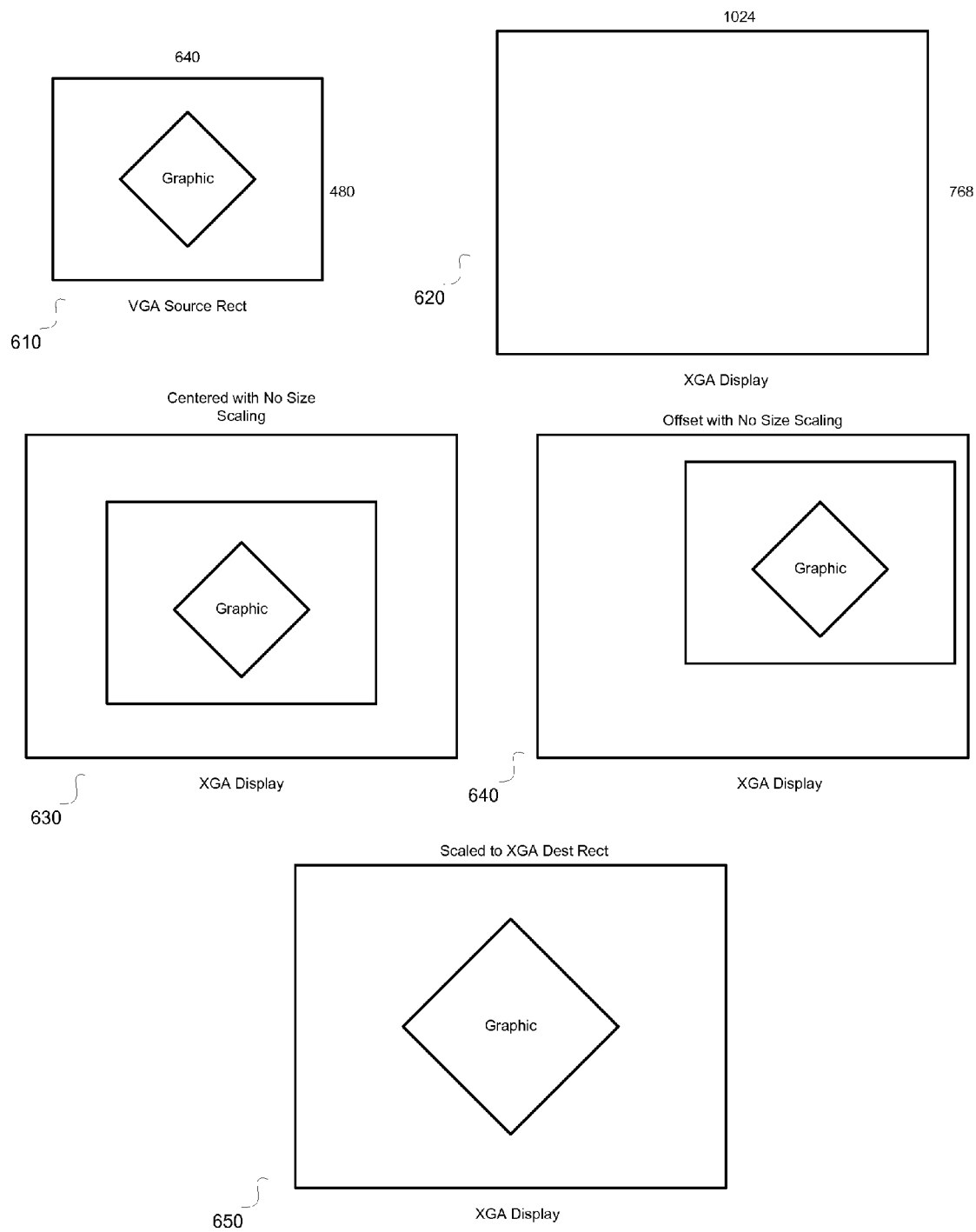
FIG. 6 shows examples of scaling from VGA to XGA (Extended Graphics Array).

FIG. 6 shows examples of scaling from VGA to XVGA (Extended VGA). Surface 610 is a graphic rendered to a VGA source rect. Display 620 is an XGA display. VGA and XGA have the same aspect ratios, with XGA being 1.6 times larger in each dimension. Example 630 shows the VGA source rect surface 610 centered on the XGA display. This process does not scale surface 610 per se, but rather uses a dest rect that offsets the source rect to the center of the XGA display while keeping it the same size. Example 640 shows the VGA source rect surface 610 with a different offset. It should also be noted that the entirety of surface 610 need not be used in the scaling process. An offset may be chosen so that a portion of surface 610 is not shown on a display. Example 650 shows VGA source rect surface 610 scaled to a dest rect that uses all available pixels in the WVGA display.

The examples shown in FIGS. 5 and 6 show scenarios in which the disclosed apparatuses, methods, and computer program products may help to improve power consumption, provide for a constant frame rate, or reduce memory usage when compared to other conventional rendering methods.

Figure 7:
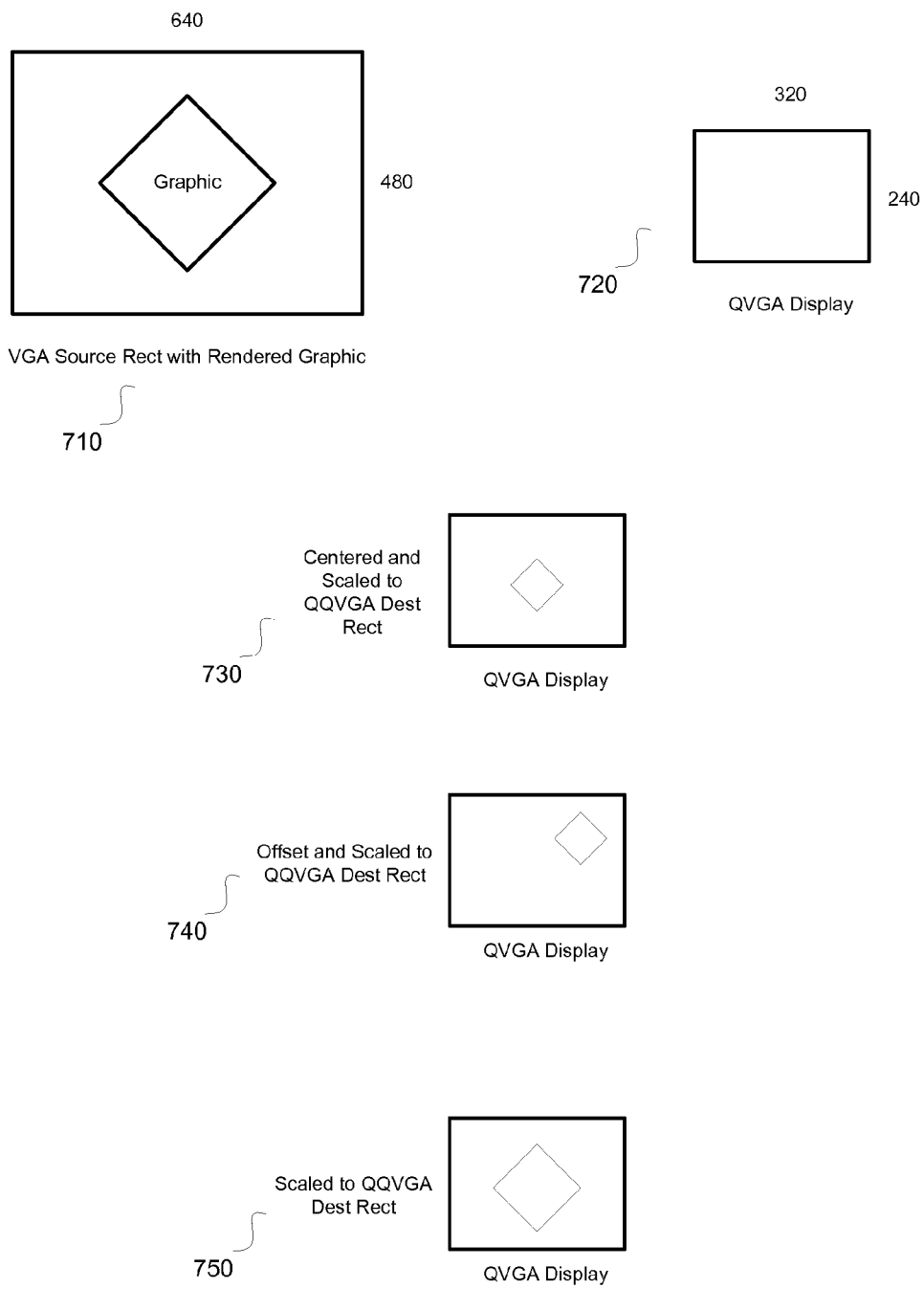
FIG. 7 shows examples of scaling from VGA to QVGA (Quarter VGA) and QQVGA (Quarter Quarter VGA).

FIG. 7 shows examples of scaling from VGA to QVGA (Quarter VGA) and QQVGA (Quarter Quarter VGA). Surface 710 is a graphic rendered to a VGA source rect. Display 720 is a QVGA display. VGA and QVGA have the same aspect ratios, with QVGA being half as large as VGA in each dimension. Example 730 shows the VGA source rect surface 710 downscaled to QQVGA and centered on the QVGA display. Example 740 shows the VGA source rect surface 710 downscaled to QQVGA with a different offset. It should also be noted that the entirety of surface 710 need not be used in the scaling process. An offset may be chosen so that a portion of surface 710 is not shown on a display. Example 750 shows VGA source rect surface 710 scaled to a dest rect that uses all available pixels in the QVGA display.

The examples shown in FIG. 7 show scenarios in which the disclosed apparatuses, methods, and computer program products may help to improve power consumption, provide for a constant frame rate, or reduce memory usage when compared to other conventional anti-aliasing and rendering methods.

The apparatuses, methods, and computer program products described above may be employed various types of devices, such as a wireless phone, a cellular phone, a laptop computer, a wireless multimedia device (e.g., a portable video player or portable video gaming device), a wireless communication personal computer (PC) card, a personal digital assistant (PDA), an external or internal modem, or any device that communicates through a wireless channel.

Such devices may have various names, such as access terminal (AT), access unit, subscriber unit, mobile station, mobile device, mobile unit, mobile phone, mobile, remote station, remote terminal, remote unit, user device, user equipment, handheld device, etc.

Any device described above may have a dedicated memory for storing instructions and data, as well as dedicated hardware, software, firmware, or combinations thereof. If implemented in software, the techniques may be embodied as instructions on a computer-readable medium, such as random access memory (RAM), read-only memory (ROM), non-volatile random access memory (NVRAM), electrically erasable programmable read-only memory (EEPROM), FLASH memory, magnetic or optical data storage device, or the like, executable by one or more processors. The instructions cause one or more processors to perform certain aspects of the functionality described in this disclosure.

The techniques described in this disclosure may be implemented within a general purpose microprocessor, digital signal processor (DSP), application specific integrated circuit (ASIC), field programmable gate array (FPGA), or other equivalent logic devices. Accordingly, components described as modules may form programmable features of such a process, or a separate process.

Various embodiments described herein may be combined in whole or in part. These and other embodiments are within the scope of the following claims.

The invention claimed is:

1. An apparatus for processing graphics comprising:
   a graphics processor configured to render a surface at a source resolution, and configured to store a scaling parameter in a surface description associated with the rendered surface, the scaling parameter defining the source resolution and a destination resolution; and
   a display processor configured to retrieve the scaling parameter from the surface description associated with the rendered surface, and configured to scale the rendered surface to the destination resolution, wherein one or more rendered surfaces are included in a frame to be displayed.

2. The apparatus of claim 1, wherein the scaling parameter is an EGL surface attribute.

3. The apparatus of claim 1, wherein the source resolution and the destination resolution are defined by a source rectangle and a destination rectangle, respectively.

4. The apparatus of claim 3, wherein the source rectangle defines a region of interest within a rendered surface and the destination rectangle defines a region of a display on which to display the region of interest of the rendered surface.

5. The apparatus of claim 1, further including:
   a memory configured to store the scaling parameter; and
   a control processor configured to instruct the display processor to scale the rendered surface based on the scaling parameter.

6. The apparatus of claim 1, wherein the scaling parameter defines an offset.

7. An apparatus for processing graphics comprising:
   means for rendering a surface at a source resolution;
   means for storing a scaling parameter in a surface description associated with the rendered surface, the scaling parameter defining the source resolution and a destination resolution;
   means for retrieving the scaling parameter from the surface description associated with the rendered surface; and
   means for scaling the rendered surface to the destination resolution, wherein one or more rendered surfaces are included in a frame to be displayed.

8. The apparatus of claim 7, wherein the scaling parameter is an EGL surface attribute.

9. The apparatus of claim 7, wherein the source resolution and the destination resolution are defined by a source rectangle and a destination rectangle, respectively.

10. The apparatus of claim 9, wherein the source rectangle defines a region of interest within a rendered surface and the destination rectangle defines a region of a display on which to display the region of interest of the rendered surface.

11. The apparatus of claim 7, further including:
means for instructing the means for scaling to scale the rendered surface based on the scaling parameter.

12. The apparatus of claim 7, wherein the scaling parameter defines an offset.

13. A method for scaling a rendered surface comprising:
rendering, with a graphics processor, a surface at a source resolution;
storing, in a memory, a scaling parameter in a surface description associated with the rendered surface, the scaling parameter defining the source resolution and a destination resolution;
retrieving, with a display processor, the scaling parameter from the surface description associated with the rendered surface; and
scaling, with the display processor, the rendered surface to the destination resolution, wherein one or more rendered surfaces are included in a frame to be displayed.

14. The method of claim 13, wherein the source resolution and destination resolution are associated with the surface through EGL surface attributes.

15. The method of claim 13, wherein the source resolution and the destination resolution are defined by a source rectangle and a destination rectangle, respectively.

16. The method of claim 15, wherein the source rectangle defines a region of interest within a rendered surface and the destination rectangle defines a region of a display on which to display the region of interest of the rendered surface.

17. The method of claim 13, further including:
establishing a connection to a display;
determining display characteristics;
sending the source resolution and the destination resolution to an API;
sending a display command; and
sending a command instructing the display processor to perform the scaling step.

18. The method of claim 13, wherein the destination resolution defines an offset.

19. A non-transitory computer-readable medium storing computer-executable instructions for scaling a rendered surface, the computer-executable instructions comprising:
code for causing a computer to render a surface at a source resolution;
code for causing a computer to store a scaling parameter in a surface description associated with the rendered surface, the scaling parameter defining the source resolution and a destination resolution;
code for causing a computer to retrieve the scaling parameter from the surface description associated with the rendered surface; and
code for causing a computer to scale the rendered surface to the destination resolution,
wherein one or more rendered surfaces are included in a frame to be displayed.

20. The non-transitory computer-readable medium of claim 19, wherein the source resolution and destination resolution are associated with the surface through EGL surface attributes.

21. The non-transitory computer-readable medium of claim 19, wherein the source resolution and the destination resolution are defined by a source rectangle and a destination rectangle, respectively.

22. The non-transitory computer-readable medium of claim 21, wherein the source rectangle defines a region of interest within a rendered surface and the destination rectangle defines a region of a display on which to display the region of interest of the rendered surface.

23. The non-transitory computer-readable medium of claim 19, further including:
code for causing a computer to establish a connection to a display;
code for causing a computer to determine display characteristics;
code for causing a computer to send the source resolution and the destination resolution to an API;
code for causing a computer to send a display command; and
code for causing a computer to send a command instructing a display processor to perform the scaling step.

24. The non-transitory computer-readable medium of claim 19, wherein the destination resolution defines an offset.

* * * * *